United States Patent
Hollo et al.

(10) Patent No.: US 10,532,482 B2
(45) Date of Patent: Jan. 14, 2020

(54) METHOD, SYSTEM AND DEVICE FOR CHANGING OF CUTTING TOOLS

(71) Applicant: Rosjoh Pty Ltd, Tullamarine (AU)

(72) Inventors: John Hollo, Williamstown (AU); Ross Kaigg, Croydon Hills (AU)

(73) Assignee: Rosjoh Pty Ltd, Tullamarine (AU)

( * ) Notice: Subject to any disclaimer, the term of this patent is extended or adjusted under 35 U.S.C. 154(b) by 258 days.

(21) Appl. No.: 15/101,330

(22) PCT Filed: Dec. 2, 2014

(86) PCT No.: PCT/AU2014/001089
§ 371 (c)(1),
(2) Date: Jun. 2, 2016

(87) PCT Pub. No.: WO2015/081369
PCT Pub. Date: Jun. 11, 2015

(65) Prior Publication Data
US 2016/0297093 A1   Oct. 13, 2016

(30) Foreign Application Priority Data
Dec. 2, 2013   (AU) ................................ 2013904663

(51) Int. Cl.
*B26D 7/26* (2006.01)
*B23B 29/04* (2006.01)
*B23B 31/107* (2006.01)

(52) U.S. Cl.
CPC .......... *B26D 7/2614* (2013.01); *B23B 29/046* (2013.01); *B23B 31/1074* (2013.01); *B26D 7/2621* (2013.01); *B23B 2270/06* (2013.01)

(58) Field of Classification Search
None
See application file for complete search history.

(56) References Cited

U.S. PATENT DOCUMENTS 3,886,833 A * 6/1975 Gunn ................... B26D 7/2635
                                                                 83/499
3,894,461 A * 7/1975 Jakob ................... B26D 7/2621
                                                                 83/665
(Continued)

FOREIGN PATENT DOCUMENTS

CN           101357407 A        2/2009

OTHER PUBLICATIONS

ISA Australian Patent Office, International Search Report Issued in Application No. PCT/AU2014/001089, dated Jan. 19, 2015, WIPO, 3 pages.

*Primary Examiner* — Ryan J. Walters
*Assistant Examiner* — Lawrence Averick
(74) *Attorney, Agent, or Firm* — McCoy Russell LLP

(57) ABSTRACT

The present invention relates to the field of industrial cutting machines and cutting tools therefore. In one particular aspect the present invention relates to a method and system for quickly changing cutting tools in computer controlled cutting machines, in a first aspect of embodiments described herein there is provided a mechanism for retaining a cutting tool of a cutting machine, the mechanism having a longitudinal axis substantially perpendicular to a cutting surface, the mechanism comprising a mount associated with the cutting machine, a holder for a cutting tool, a retaining device for removably attaching the holder to the mouth, wherein the retaining device is adapted to bias the holder in the direction of the longitudinal axis.

5 Claims, 5 Drawing Sheets

(56) References Cited

U.S. PATENT DOCUMENTS

| | | | | |
|---|---|---|---|---|
| 4,131,047 A * | 12/1978 | Schriber | B26D 7/2614 | 144/230 |
| 4,380,945 A * | 4/1983 | Guild | B26D 5/02 | 83/482 |
| 4,438,673 A * | 3/1984 | Noffke | B26D 5/02 | 83/482 |
| 4,517,872 A * | 5/1985 | Dontscheff | B26D 7/084 | 83/471.2 |
| 4,824,428 A * | 4/1989 | Cavagna | B26D 5/04 | 493/352 |
| 4,876,933 A * | 10/1989 | Tahara | B26D 5/04 | 83/482 |
| 5,058,475 A * | 10/1991 | Tidland | B26D 5/04 | 83/481 |
| 5,083,489 A * | 1/1992 | Tidland | B26D 5/04 | 83/482 |
| 5,131,304 A * | 7/1992 | Paavola | B26D 5/04 | 83/478 |
| 5,370,026 A * | 12/1994 | Cavagna | B26D 1/245 | 83/478 |
| 5,690,012 A * | 11/1997 | Blandin | B26D 7/2635 | 83/507 |
| 5,927,175 A * | 7/1999 | Franks | B23D 21/00 | 225/96 |
| 5,941,153 A | 8/1999 | Chang | | |
| 6,280,373 B1 * | 8/2001 | Lanvin | B26D 7/025 | 493/194 |
| 6,591,725 B1 * | 7/2003 | Martin | B23D 45/062 | 83/471.3 |
| 6,732,625 B1 * | 5/2004 | Boynton | B26D 1/245 | 83/482 |
| 6,868,766 B1 * | 3/2005 | Sellers | B26D 5/04 | 144/237 |
| 8,210,079 B2 * | 7/2012 | Myers | B26D 1/0006 | 83/498 |
| 8,887,607 B2 * | 11/2014 | Cavagna | B26D 7/2621 | 83/482 |
| 9,555,553 B2 * | 1/2017 | Rutan | B26D 7/22 | |
| 10,035,279 B2 * | 7/2018 | Tsuchiya | B26D 3/085 | |
| 2002/0174913 A1 * | 11/2002 | Johansson | B23D 47/12 | 144/154.5 |
| 2004/0159693 A1 * | 8/2004 | Adachi | B26D 5/02 | 225/3 |
| 2005/0081696 A1 * | 4/2005 | Kapolnek | B26D 7/2614 | 83/698.51 |
| 2006/0201306 A1 * | 9/2006 | Zannini | B26D 7/2635 | 83/698.11 |
| 2008/0210075 A1 * | 9/2008 | Oberhoff | B26D 7/2635 | 83/482 |
| 2009/0038458 A1 * | 2/2009 | Ridolfi | B26D 3/161 | 83/471.2 |
| 2012/0000334 A1 * | 1/2012 | Cavagna | B26D 5/04 | 83/522.24 |
| 2012/0234147 A1 * | 9/2012 | Myers | B26D 1/0006 | 83/174 |
| 2013/0247390 A1 * | 9/2013 | Rutan | B26D 7/22 | 30/390 |
| 2013/0251435 A1 * | 9/2013 | Yamashita | B26D 1/185 | 400/621 |
| 2014/0139600 A1 * | 5/2014 | Yamashita | B26D 1/185 | 347/104 |
| 2017/0072578 A1 * | 3/2017 | Tsuchiya | B26D 3/085 | |

* cited by examiner

METHOD, SYSTEM AND DEVICE FOR CHANGING OF CUTTING TOOLS

FIELD OF INVENTION

The present invention relates to the field of industrial cutting machines and cutting tools therefore.

In one form, the invention relates to changing of cutting tools of the type used in industrial cutting machines.

In one particular aspect the present invention relates to a method and system for quickly changing cutting tools in computer controlled cutting machines.

It will be convenient to hereinafter describe the invention in relation to changing round knives in cutting machines, however it should be appreciated that the present invention is not so limited and can be used for a wide range of knives and other cutting tools including creasing tools, passepartout tools, universal drawing tools, raster braile tools, electric oscillating tools and soforth that are typically used with cutting machines.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

Cutting machines are extensively used in industry for cutting shapes from bulk material. The shapes are usually fed into an automated process where they are formed or incorporated into a finished product. A wide range of materials are cut using automated cutting machines, including leather, paper (eg BOP, EVA, kraft and brown paper), film (eg diffuse, shading, light-increasing, reflecting), cardboard, composites, industrial textiles, fabrics of natural fibre or synthetics, polymers, silicone and soforth. These materials are typically supplied as one or more sheets or from a roll.

For example, in the garment and shoe industries, automatic systems have widely replaced manual cutting because efficiently provide large numbers of identical, accurately out fabric pieces with minimal material wastage.

Automated cutting systems include a computer controlled cutting tool. The desired shape is programmed in a format that can be read by the computer system. The cutting tool may be guided by the computer cut a single layer of material, or multiple layers at the same time. The material is typically laid flat on a horizontal cutting surface.

Many different cutting tools are used in automated cutting machines, including a wide range of knives and other cutting tools including creasing tools, passepartout tools, universal drawing tools, raster braile tools, electric oscillating tools and soforth.

Knives used with cutting machines typically include, for example, round knives, V-knives, drag knives, slitter knives, oscillating blades, hollow drills, reciprocating blades and sorforth. The type of cutting tool used will depend on a number of factors including the characteristics of the material. The cutting tools may be passive or driven in directions corresponding to the two dimensional shape required. Some cutting tools ("high ply cutters") are used for high volume, low cost goods such as garments and upholstery where high accuracy is not required. Other cutting tools ('low ply cutters' and 'single ply cutters' are used when greater cutting accuracy is needed, such as for lower volume, higher value goods.

In order to maintain smooth, efficient and accurate cutting the cutting tool must be sharp. With extended use, cutting tools become blunt and must be replaced with a sharper cutting tool.

The cutting tool is typically changed manually by an operator using a tool but this has several drawbacks including:
 the need to halt the cutting process for a period of time, thus reducing productivity,
 potential occupational safety risks for the operator handling sharp cutting tools,
 the need to utilise devices such as screwdrivers, wrenches and spanners to remove the blunt cutting tool and attach the sharp cutting tool,
 the difficulty of accurately mounting replacement cutting tool,
 potential misalignment of the cutting tool.

Accordingly there is a need for improving the operation of cutting systems of the prior art.

SUMMARY OF INVENTION

An object of the present invention is to provide a system for attaching a cutting tool to a cutting machine.

Another object of the present invention is to provide improved cutting tool replacement in a cutting machine.

A further object of the present invention is to alleviate at least one disadvantage associated with the related art.

It is an object of the embodiments described herein to overcome or alleviate at least one of the above noted drawbacks of related art systems or to at least provide a useful alternative to related art systems.

In a first aspect of embodiments described herein there is provided a mechanism for retaining a cutting tool of a cutting machine, the mechanism having a longitudinal axis substantially perpendicular to a cutting surface, the mechanism comprising:
 a mount associated with the cutting machine,
 a holder for a cutting tool,
 a retaining device for removably attaching the holder to the mount,
 wherein the retaining device is adapted to bias the holder in the direction of the longitudinal axis.

Preferably the retaining device is adapted to bias the holder in the direction of both the longitudinal axis and an axis perpendicular thereto. Typically the retaining device is a manually operable quick release device, such as a biased pin (13). Preferably the locking action is provided by a biasing means such as a coil spring that can be manually released by a button or other convenient means.

The holder and mount are adapted to mate in a predetermined orientation that ensures that the cutting tool is maintained in the correct rotational alignment for accurate cutting of shapes. For example the holder and mount may include tapered mating surfaces. In one embodiment the mount is generally T-shaped and includes a shaft that is received in a correspondingly shaped bore in the holder, and a flange at one end of the shaft that is receive in a corresponding shaped recess in the holder. In this embodiment the longitudinal axis of the shaft and the flange are perpendicular. It will be readily apparent to the person skilled in the art that a kinematic inversion of this arrangement would also work.

The mount may releasably attach to the retaining device. For example, the mount may include a recess for receiving at least part of the retaining device. The mount and retaining device fit together in any convenient manner, such as by interference or snap-fit.

In a second aspect of embodiments described herein there is provided a system for retaining a cutting tool of a cutting machine, the system comprising:

a mount associated with the cutting machine, a holder for a cutting tool, the holder being adapted to mate in a predetermined orientation with the mount and having a longitudinal axis substantially perpendicular to a cutting surface, a retaining device for insertion into the holder and/or the mount to removably attach the holder to the mount, the retaining device being adapted to bias the holder in the direction of the longitudinal axis, wherein the bias can be overcome by applying manual pressure to release the retaining device from the holder and/or mount.

In another aspect of embodiments described herein there is provided a method for attaching a cutting tool to a cutting machine using a mechanism, the method comprising the steps of:

mating the holder to the mount in the pre-determined orientation, and attaching the holder to the mount using the retaining device, the retaining device biasing the holder in the direction of the longitudinal axis of the mechanism.

The system of the present invention may be adapted for manual operation. Alternatively, or in addition, the system may be adapted for automatic changing of a cutting tool. For example, the system may include an auto changing device which stores sharpened cutting tools attached to holders, ready to be exchanged with a blunt cutting tool and associated holder.

Other aspects and preferred forms are disclosed in the specification and/or defined in the appended claims, forming a part of the description of the invention.

In essence, embodiments of the present invention stem from the realization that the mount and knife holder can be configured so that the mate in a preferred orientation. Furthermore they can be interlocked in a manner that is secure during use, but easily released, for example, manually.

Advantages provided by the present invention comprise the following:

the cutting tool can be rapidly changed with minimal down-time and minimal disruption to productivity, no need to use devices such as screwdrivers and spanners to change a cutting tool, the replacement cutting tool can be accurately mounted without need for further adjustment, reduced interaction between operator and machine, reducing occupational safety risks.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

Figure 1A:
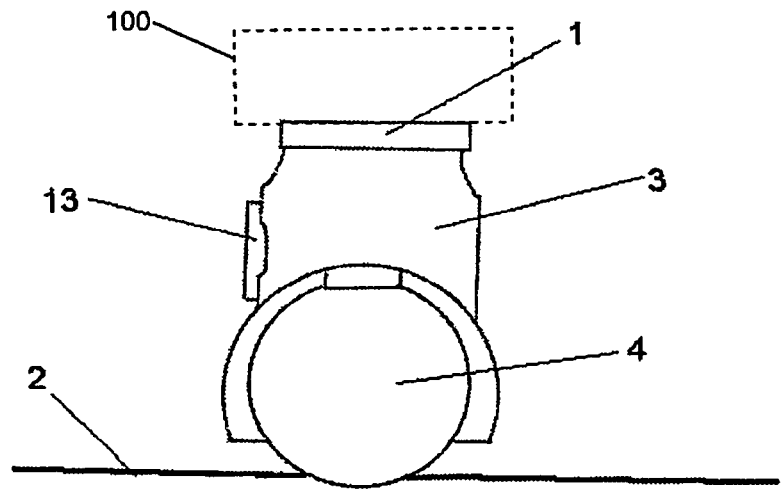
FIG. 1 illustrates the device and system of the present invention when assembled (FIG. 1a) and in cross-sectional plan view (FIG. 1b)

FIG. 1a depicts a preferred embodiment the present invention which includes a mount (1) associated with a cutting machine (100), a holder (3) for a cutting tool in the form of a circular blade (4) for cutting material (2) and a quick release pin (13) for connecting the mount (1) and holder (3). This embodiment is particularly preferred because it applies constant downward pressure and any movement tends to increase the downward pressure.

Figure 1B:
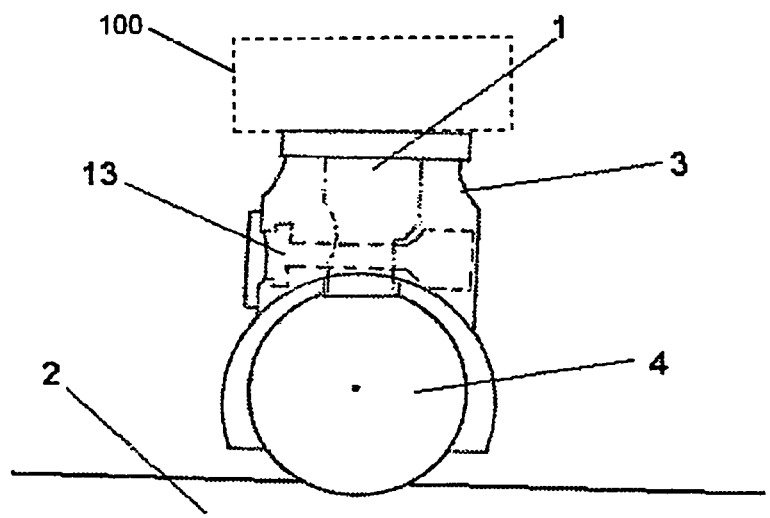

FIG. 1b is a plan view indicating the interrelationship of the components.

Figure 6A:
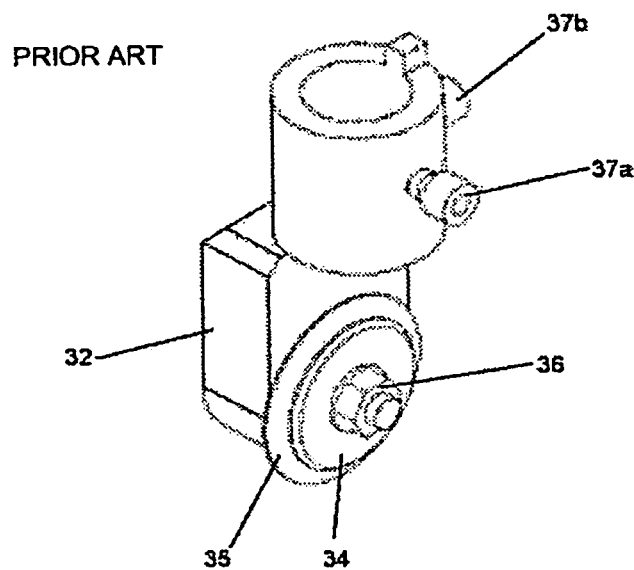
FIG. 6 illustrates a round knife assembly of the prior art in assembled (FIG. 6a) and exploded (FIG. 6b) views.
Figure 6B:
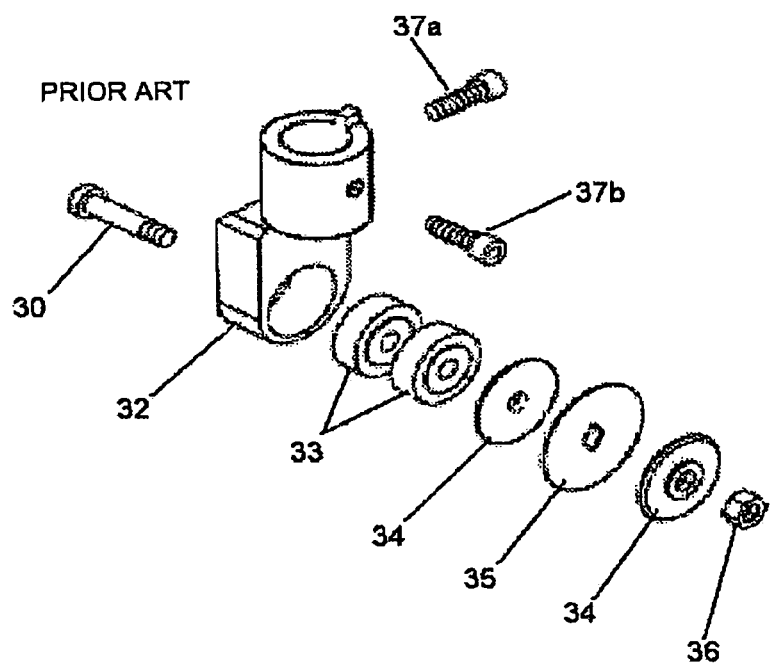

The present invention can be compared and contrasted with the example of the prior art round knife assembly depicted at FIG. 6a, FIG. 6b is an exploded view of the prior art assembly including a knife holder (32) having a knife bolt (30) and stop nut (36) for attaching special bearings (33), a limiting discs (34) and the round knife (35). The knife holder (32) is attached to the cutting machine by two screws (37a, 37b).

When the round knife of this system becomes blunt, an operator must either replace the round knife by undoing the knife bolt (30), or replace the knife holder by undoing the two screws (37a, 37b). Either way it is necessary to remove the knife bolt so two tools may be required.

Other systems exist in the prior art, such as those using cam locks also require the use of tools when exchanging blunt cutting tools for sharp cutting tools.

Figure 2:
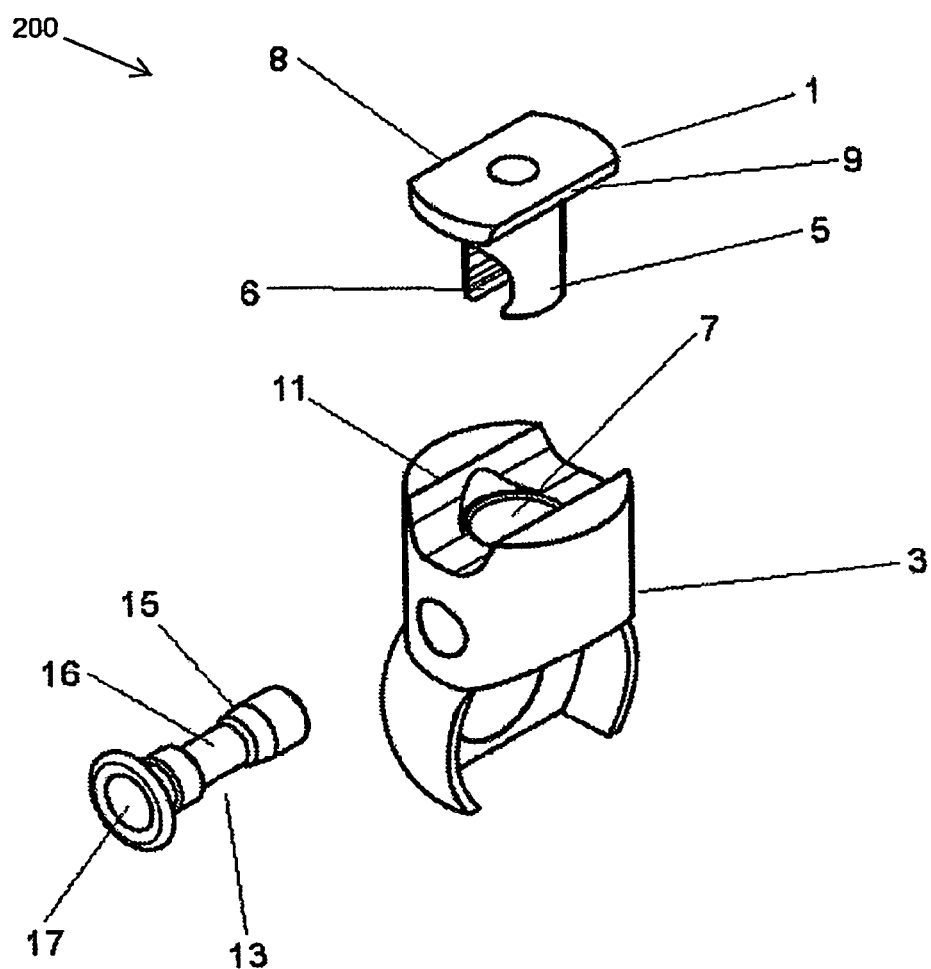
FIG. 2 illustrates the device of FIG. 1 in exploded view.

FIG. 2 depicts the system 200 of FIG. 1 in exploded view. Specifically, it shows the mount (1) fitting into the holder (3) in a pre-determined orientation that ensures that correct tool rotational alignment is maintained when a blunt cutting tool is replace by a sharp cutting tool. The mount shaft (5) is inserted in the holder bore (7). The mount (1) has a flange (8) having a first tapered mating surface (9) that is machined to correspond in shape to a second tapered mating surface (11) of the holder (3) so that it will mate the mount (1) in only one direction.

The combination of the first and second tapered mating surfaces (9, 11) with the round mount shaft (5) fitting in the holder bore (7).

The angle on the first and second tapered mating surfaces (9,11) is such that it resists rotational forces that would otherwise drive apart the mount (1) and holder (3) but at the same time does not lock such that excessive force is needed to disengage the mount (1) and holder (3).

The mount shaft (5) also includes a recess (10) for receiving the locking pin (13). The recess (6) is generally C-shaped, including an opening for snap fitting over the central narrow barrel section (16) of the pin (13).

Figure 3:
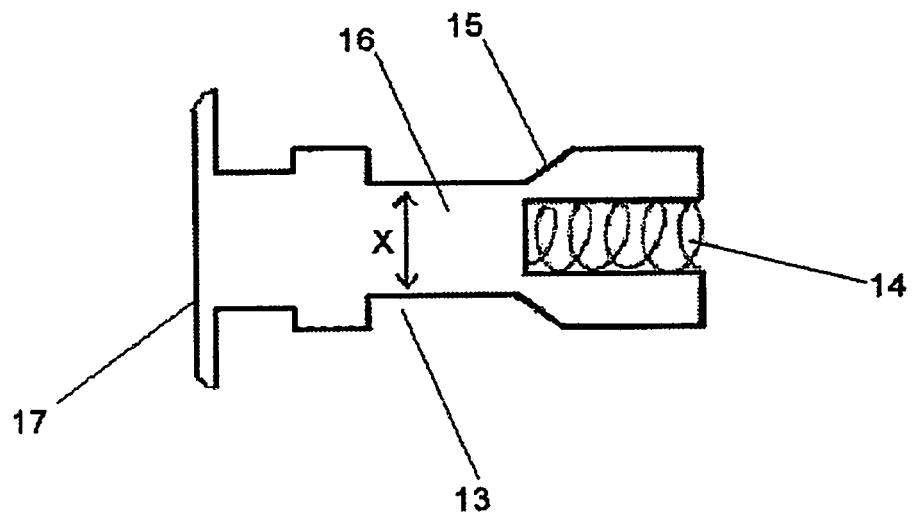
FIG. 3 illustrates the locking pin of FIG. 1 in cross-section.

FIG. 3 depicts the locking pin (13) in greater cross-sectional detail. The pin (13) is spring loaded (14) to lock the mount (1) to the holder (3). The pin (13) is provided with a tapered surface (15) the angle of which is chosen to force together the tapered mount surfaces of the mount (1) and holder (3), thus holding the two parts together. More specifically, the tapered surface (15) nestles against a correspondingly tapered surface (20, as illustrated in FIG. 4) and this, together with the aid of resilient means (14) serves to releasably retain the mount (1) to the holder (3).

The pin (13) also exerts force that expands the mount shaft (5), improving the interference fit with the inner surface of the holder bore (7). This contributes to the stability and security of coupling.

The pin (13) incorporates a button surface (17) that remains external to the holder (3) and can be depressed against the spring (14) using moderate finger pressure. Thus, removal and fitting of the pin (13) can be carried out with one hand.

Figure 4:
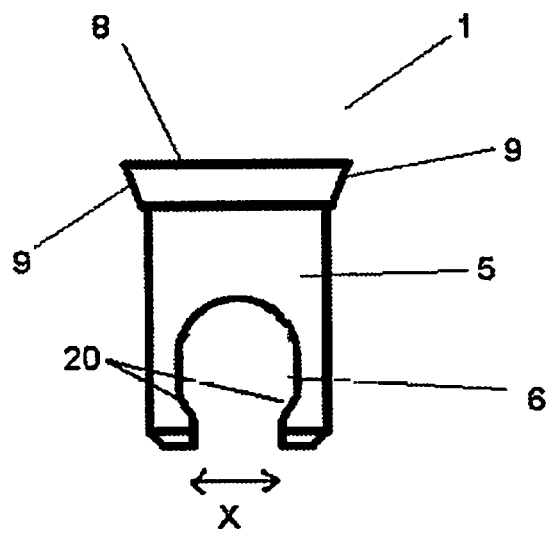
FIG. 4 illustrates the mount of FIG. 1 in cross-section.

FIG. 4 depicts the mount (1) in greater detail. The mount shaft (5) includes a recess (6) which has a width X that matches the width X of the barrel of the pin (13). The width X tends to increase as the mount (1) expands to fit over the barrel of the pin (13).

Thus the mount (1), holder (3) and pin (13) are releasably locked together by a first force substantially parallel to the cutting surface and a second force substantially perpendicular to the cutting surface.

Figure 5A:
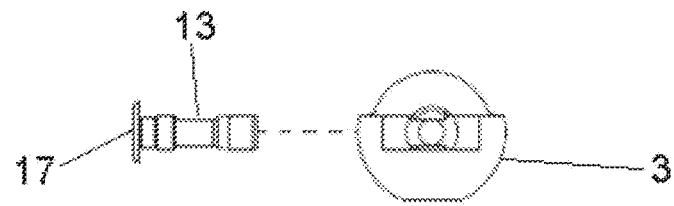
FIG. 5 illustrates the device of FIG. 1 viewed from underneath (FIG. 5a), from the front (FIG. 5b), from the side (FIG. 5c) and from the top (FIG. 5d)
Figures 5B, 5C:
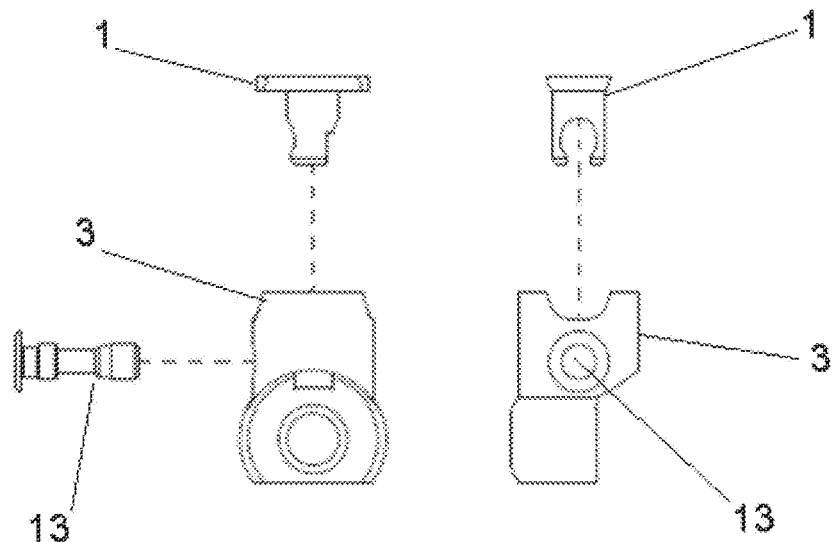
Figure 5D:
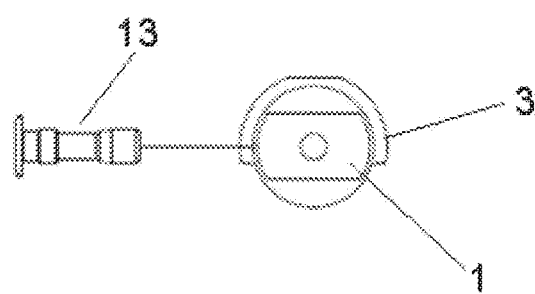

FIG. 5 illustrates the device of FIG. 1 viewed from underneath (FIG. 5a), from the front (FIG. 5b), from the side (FIG. 5c) and from the top (FIG. 5d).

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A device for retaining a cutting tool of a cutting machine, the device having a longitudinal axis perpendicular to a cutting surface, the device comprising:
   a generally T-shaped mount having a shaft with a flange perpendicular to the shaft at one end, the mount being associated with the cutting machine,
   a holder for the cutting tool, the holder having a bore for receiving the shaft of the mount and a first recess shaped correspondingly to the flange for receiving the flange, the holder adapted to mate in a pre-determined orientation with the mount,
   a retaining device for removably attaching the holder to the mount,
   wherein the retaining device is received within a second recess, wherein the second recess is in the shaft and wherein the retaining device is adapted to bias the holder in a direction of the longitudinal axis.

2. The device according to claim 1, wherein the retaining device is adapted to bias the holder in the direction of the longitudinal axis and an axis perpendicular thereto.

3. The device according to claim 1, wherein the retaining device is a manually operable quick release device.

4. The device according to claim 1, wherein
   the holder has a longitudinal axis perpendicular to the cutting surface,
   the retaining device is for insertion into the holder and/or the mount, and
   the device is configured such that the bias can be overcome by applying manual pressure to release the retaining device from the holder and/or the mount.

5. A method for manually attaching the cutting tool to the cutting machine using the device of claim 1, the method comprising the steps of:
   mating the holder to the mount in the pre-determined orientation, and
   attaching the holder to the mount by locating the retaining device in the second recess, the retaining device biasing the holder in the direction of the longitudinal axis of the device.

* * * * *